United States Patent
Wang et al.

(10) Patent No.: US 12,395,450 B2
(45) Date of Patent: Aug. 19, 2025

(54) DATA PACKET SCHEDULING METHOD AND RELATED APPARATUS

(71) Applicant: HUAWEI TECHNOLOGIES CO., LTD., Guangdong (CN)

(72) Inventors: Chuang Wang, Shenzhen (CN); Shoushou Ren, Beijing (CN); Rui Meng, Beijing (CN); Bingyang Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 409 days.

(21) Appl. No.: 18/162,542

(22) Filed: Jan. 31, 2023

(65) Prior Publication Data
US 2023/0179534 A1 Jun. 8, 2023

Related U.S. Application Data

(63) Continuation of application No. PCT/CN2021/104218, filed on Jul. 2, 2021.

(30) Foreign Application Priority Data

Jul. 31, 2020 (CN) .......................... 202010760185.1

(51) Int. Cl.
*H04L 47/56* (2022.01)
*H04L 47/28* (2022.01)
(Continued)

(52) U.S. Cl.
CPC ............ *H04L 47/564* (2013.01); *H04L 47/28* (2013.01); *H04L 47/50* (2013.01); *H04L 47/56* (2013.01);
(Continued)

(58) Field of Classification Search
CPC ....... H04L 47/564; H04L 47/28; H04L 47/50; H04L 47/56; H04L 47/6275; H04L 47/826
See application file for complete search history.

(56) References Cited

U.S. PATENT DOCUMENTS 7,948,888 B2 * 5/2011 Gusat .................... H04L 47/562
370/235
8,054,847 B2 * 11/2011 Albrecht ................. H04L 47/30
370/412
(Continued)

FOREIGN PATENT DOCUMENTS

CN 104486250 A 4/2015
CN 106992941 A 7/2017
(Continued)

OTHER PUBLICATIONS

Extended European Search Report in European Appln No. 21850966.9, dated Nov. 17, 2023, 16 pages.
(Continued)

*Primary Examiner* — Chandrahas B Patel
(74) *Attorney, Agent, or Firm* — Fish & Richardson P.C.

(57) ABSTRACT

This application provides data packet scheduling methods and apparatuses. One method includes: A first network device receives, at a first moment, a data packet from a second network device in a network, the first network device determines a first reference moment based on the first moment and time information carried in the data packet, the first network device determines, based on the first reference moment, a target queue from a plurality of queues included in a first queue system and adds the data packet to the target queue, and the first network device processes the target queue according to a scheduling rule of the plurality of queues.

16 Claims, 11 Drawing Sheets

(51) Int. Cl.
*H04L 47/50* (2022.01)
*H04L 47/6275* (2022.01)
*H04L 47/70* (2022.01)

(52) U.S. Cl.
CPC ........ *H04L 47/6275* (2013.01); *H04L 47/826* (2013.01)

(56) References Cited

U.S. PATENT DOCUMENTS

| | | | |
|---|---|---|---|
| 8,498,296 B2 * | 7/2013 | Bitar | H04L 45/302 370/413 |
| 11,405,323 B2 * | 8/2022 | Dejanovic | H04L 47/2441 |
| 2010/0284274 A1 | 11/2010 | Ghanadan et al. | |
| 2013/0022042 A1 | 1/2013 | Vasseur et al. | |
| 2014/0146682 A1 | 5/2014 | Kakadia et al. | |
| 2015/0222970 A1 | 8/2015 | Kanonakis | |

FOREIGN PATENT DOCUMENTS

| | | |
|---|---|---|
| CN | 107182090 A | 9/2017 |
| CN | 107431667 A | 12/2017 |
| CN | 107733812 A | 2/2018 |
| CN | 108282415 A | 7/2018 |
| CN | 110166380 A | 8/2019 |
| CN | 111416779 A | 7/2020 |
| CN | 111431822 A | 7/2020 |
| CN | 114095397 A | 2/2022 |
| CN | 114095453 A | 2/2022 |
| CN | 114095454 A | 2/2022 |
| WO | 2019127597 A1 | 7/2019 |

OTHER PUBLICATIONS

Zhang et al., "Bounds on End-to-End Delay Jitter with Self-Similar Input Traffic in Ad Hoc Wireless Network," 2008 ISECS International Colloquium on Computing, Communication, Control, and Management, Aug. 3-4, 2008, 4 pages.

International Search Report and Written Opinion in International Appln. No. PCT/CN2021/104218, mailed on Aug. 30, 2021, 15 pages (with English translation).

* cited by examiner

DATA PACKET SCHEDULING METHOD AND RELATED APPARATUS

CROSS-REFERENCE TO RELATED APPLICATIONS

This application is a continuation of International Application No. PCT/CN2021/104218, filed on Jul. 2, 2021, which claims priority to Chinese Patent Application No. 202010760185.1, filed on Jul. 31, 2020. The disclosures of the aforementioned applications are hereby incorporated by reference in their entireties.

TECHNICAL FIELD

This application relates to the field of communications technologies, and more specifically, to a data packet scheduling method and a related apparatus.

BACKGROUND

A deterministic latency means that when a data packet meets an unexpected requirement, a delay and a jitter of data packet transmission meet an upper limit. Scalable data-plane deterministic data packet scheduling needs to be implemented to meet an end-to-end deterministic latency and a jitter of the data packet.

None of existing scheduling methods (for example, weighted fair queue and earliest deadline first (EDF)) can meet a deterministic latency requirement.

SUMMARY

This application provides a data packet scheduling method and a related apparatus, so that an end-to-end delay can be controllable.

According to a first aspect, an embodiment of this application provides a data packet scheduling method. The method includes: A first network device receives, at a first moment, a data packet from a second network device in a network; the first network device determines a first reference moment based on time information carried in the data packet and the first moment, where the first reference moment is a reference moment at which the data packet enters a queue in a first queue system of the first network device; the first network device determines, based on the first reference moment, a target queue from a plurality of queues included in the first queue system, and adding the data packet to the target queue, where the time information indicates a first remaining processing time, the first remaining processing time is a difference between a first theoretical time upper limit for processing the data packet by N network devices and a first actual time, the N network devices include a network device through which the data packet passes after entering the network and before arriving at the first network device, and N is a positive integer greater than or equal to 1; and the first theoretical time upper limit is a theoretical time upper limit for a period of the data packet inside a network device from an initial reference moment to the first reference moment, the first actual time is an actual time of the data packet inside the network device from the initial reference moment to a second moment, the initial reference moment is a reference moment at which the data packet enters a queue system of a first network device in the N network devices, and the second moment is a moment at which the data packet enters the first queue system; and the first network device processes the target queue according to a scheduling rule of the plurality of queues.

In the foregoing technical solution, an upper limit of an end-to-end delay of any flow may not exceed a sum of theoretical time upper limits of all output interfaces on a path of the flow. In this way, the end-to-end delay is controllable. Thus, a deterministic end-to-end delay can be provided for a data flow.

With reference to the first aspect, in a possible design, the time information includes first time indication information, the first time indication information indicates a time from a second reference moment to a second output moment, the second reference moment is a reference moment of the data packet in the second network device, and the second output moment is a moment at which the data packet is output from the second network device.

With reference to the first aspect, in a possible design, when N is a positive integer greater than or equal to 2, the time information further includes second time indication information, the second time indication information indicates a second remaining processing time, the second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device.

With reference to the first aspect, in a possible design, the time information further includes third time indication information, the third time indication information indicates a third theoretical time upper limit associated with the second network device, and the third theoretical time upper limit is a theoretical time upper limit for a period of the data packet inside the network device from the second reference moment to the first reference moment.

With reference to the first aspect, in a possible design, the plurality of queues are in a one-to-one correspondence with a plurality of preset moments, and that the first network device determines, based on the first reference moment, a target queue from a plurality of queues included in the first queue system includes: The first network device determines, based on the first reference moment, that a queue corresponding to a target moment is the target queue, where the first reference moment is not greater than the target moment, any one of the plurality of preset moments is not included between the first reference moment and the target moment, and the target moment is one of the plurality of preset moments.

With reference to the first aspect, in a possible design, that the first network device determines a first reference moment based on time information and the first moment includes: The first network device determines the first reference moment according to the following formula: $E^{h+1} = D^{h}_{res} + [(D^{h}_{max}) - (t^{h}_{out} - E^{h})] + t^{h+1}_{in}$, where $E^{h+1}$ represents the first reference moment, $D^{h}_{res}$ represents the second remaining processing time, $D^{h}_{max}$ represents the third theoretical processing time upper limit associated with the second network device, $t^{h}_{out}$ represents the second output moment, $E^{h}$ represents the second reference moment, and $t^{h+1}_{in}$ represents the first moment. The first reference moment is a reference moment at which the data packet enters a queue in a first queue system of the first network device. The second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device. The second output moment is a moment at which the data packet is output from the second network device. The second reference moment is a reference moment of the data packet in the second network device. The first moment is a moment at which the first network device receives the data packet.

With reference to the first aspect, in a possible design, that the first network device determines a first reference moment based on the time information and the first moment includes: The first network device determines the first reference moment based on the second moment, the time information, and the first moment.

With reference to the first aspect, in a possible design, that the first network device determines the first reference moment based on the second moment, the time information, and the first moment includes: The first network device determines a third remaining processing time according to the following formula: $D^{h+1}_{res}=D^{h}_{res}+[D^{h}_{max}-(t^{h}_{out}-E^{h})-(t^{h+1}_{in}-t^{h+1}_{in})]$, where $D^{h+1}$ represents the third remaining processing time, $D^{h}_{res}$ represents the second remaining processing time, $D^{h}_{max}$ represents the third theoretical processing time upper limit associated with the second network device, $t^{h}_{out}$ represents the second output moment, $E^{h}$ represents the second reference moment, $t^{h+1}_{in}$ represents the first moment, and $t^{h+1}_{in}$ represents the second moment; and the first network device determines a sum of the third remaining processing time and the second moment as the first reference moment. The second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device. The second output moment is a moment at which the data packet is output from the second network device. The second reference moment is a reference moment of the data packet in the second network device. The first moment is a moment at which the first network device receives the data packet. The second moment is a moment at which the data packet enters the first queue system.

According to a second aspect, an embodiment of this application provides a network device. The network device includes units configured to implement the method in any one of the first aspect or the possible designs of the first aspect.

According to a third aspect, an embodiment of this application provides a network device, including: a processor, configured to execute a program stored in a memory, where when the program is executed, the network device is enabled to perform the method in any one of the first aspect or the possible designs of the first aspect.

With reference to the third aspect, in a possible design, the memory is located outside the network device.

According to a fourth aspect, an embodiment of this application provides a computer-readable storage medium, including instructions, and when the instructions are run on a computer, the method in any one of the first aspect or the possible designs of the first aspect is performed.

According to a fifth aspect, an embodiment of this application provides a network device. The network device includes a processor, a memory, and instructions that are stored in the memory and that can run on the processor. When the instructions are run, the network device is enabled to perform the method in any one of the first aspect or the possible designs of the first aspect.

DESCRIPTION OF EMBODIMENTS

Figure 1:
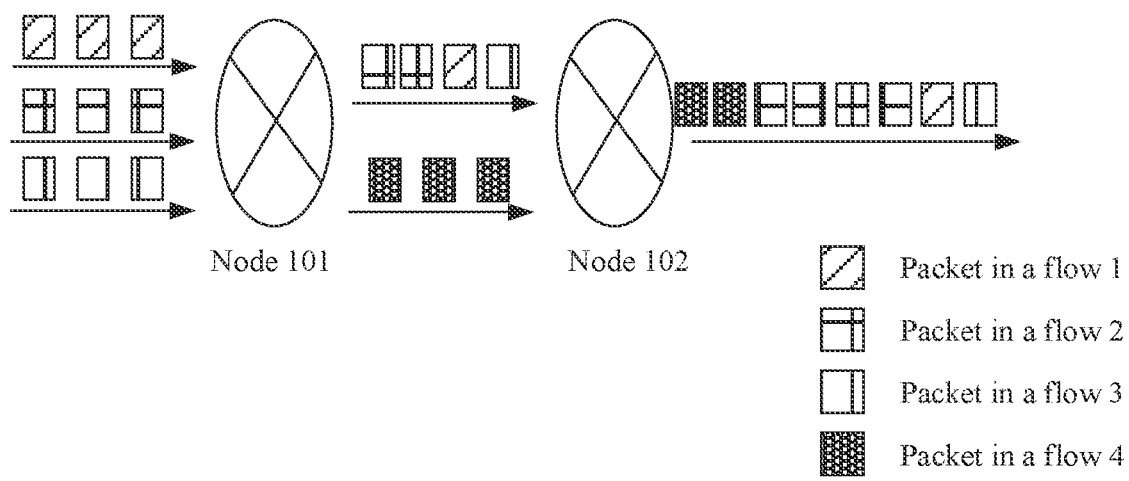
FIG. 1 is a schematic diagram of a cause of burst accumulation.

The following describes technical solutions of this application with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the terms such as "for example" and "such as" are used to represent giving an example, an illustration, or a description. Any embodiment or design scheme described as "an example" in this application should not be explained as being more preferred or having more advantages than another embodiment or design scheme. Exactly, the word "an example" is used to present a concept in a specific manner.

In embodiments of this application, "corresponding" and "relevant" may be interchangeably used sometimes. It should be noted that meanings expressed by the terms are consistent when differences are not emphasized.

In the embodiments of this application, sometimes a subscript such as $W_1$ may be written in an incorrect form such as W1. Expressed meanings are consistent when differences between them are not emphasized.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, at least one means one or more, and a plurality of means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally indicates an "or" relationship between the associated objects. At least one of the following items or a similar expression thereof refers to any combination of these items, including any combination of singular items or plural items. For example, at least one item of a, b, or c may represent a, b, c, a and b, a and c, b and c, or a, b, and c, where a, b, and c each may be singular or plural.

Burst Accumulation

In an internet protocol (IP) network, due to burst accumulation, the internet protocol network cannot provide a deterministic end-to-end delay and a jitter for a flow.

Burst accumulation is a root cause of delay uncertainty. Burst accumulation is caused by mutual pressure between different data packets.

FIG. 1 is a schematic diagram of a cause of burst accumulation.

As shown in FIG. 1, when three flows (a flow 1, a flow 2, and a flow 3) arrive at a node 101 at the same time, the three flows are completely even. Because the node 101 can process a data packet only at a line rate, the flow 2 is pressed by the other two flows. As a result, two consecutive data packets are close to each other, and a burst degree increases. After several cycles of the foregoing process, a flow of a hop forms an unpredictable large burst, and the large burst further presses another flow. As a result, a delay of the another flow increases and is unpredictable. Hop-by-hop accumulation of microbursts is a root cause of delay uncertainty. An existing method for resolving the foregoing problem either depends on time synchronization of all devices, or has a limitation on a transmission distance, and is inapplicable to a large-scale IP network.

Figure 2:
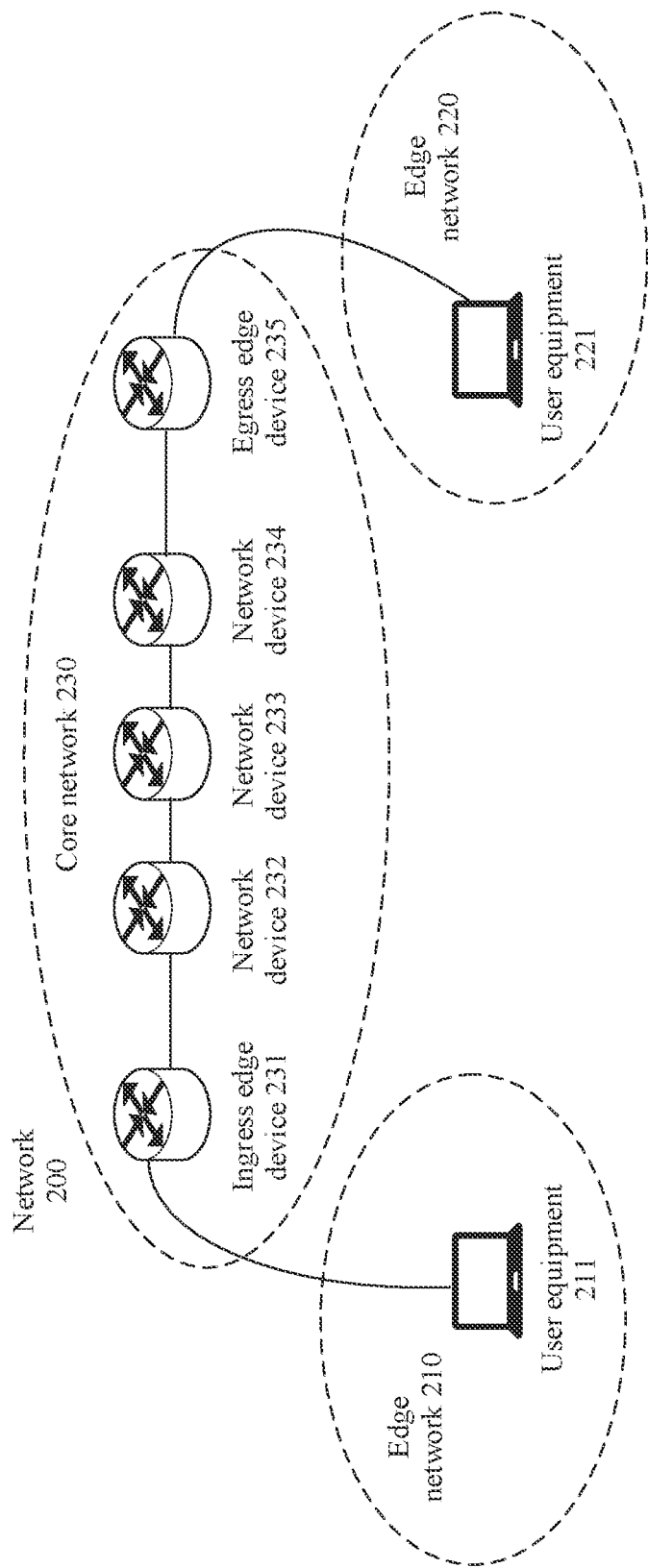
FIG. 2 is a schematic diagram of a system to which an embodiment of this application is applicable.

FIG. 2 is a schematic diagram of a system to which an embodiment of this application is applicable. A network 200 shown in FIG. 2 may include an edge network 210, an edge network 220, and a core network 230.

The edge network 210 includes user equipment 211. The edge network 220 includes user equipment 221. The core network 230 includes an ingress edge device 231, a network device 232, a network device 233, a network device 234, and an egress edge device 235.

As shown in FIG. 2, the user equipment 211 may communicate with the user equipment 221 by using the core network.

This embodiment of this application may be implemented by a device in the core network 230. For example, this embodiment of this application may be implemented by the ingress edge device 231, and may be implemented by the network device 232 to the network device 234.

A device that can implement this embodiment of this application may be a router, a switch, or the like.

Figure 3:
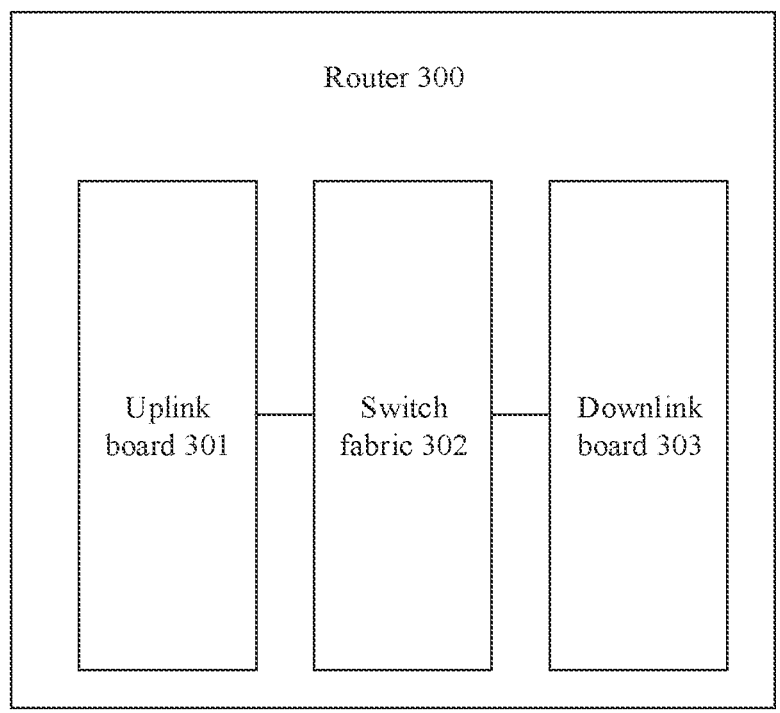
FIG. 3 is a schematic structural block diagram of a router that can implement an embodiment of this application.

FIG. 3 is a schematic structural block diagram of a router that can implement an embodiment of this application. As shown in FIG. 3, a router 300 includes an uplink board 301, a switch fabric 302, and a downlink board 303.

The uplink board may also be referred to as an uplink interface board. The uplink board 301 may include a plurality of input ports. The uplink board may decapsulate a data packet received by the input port and search for an output port according to a forwarding table. Once the output port is found (for ease of description, the found output port is referred to as a target output port below), the data packet is sent to the switch fabric 302.

The data packet in this embodiment of this application may be a data packet at a network layer, or may be a frame at a data link layer.

The switch fabric 302 forwards the received data packet to one of target output ports. Specifically, the switch fabric 302 forwards the received data packet to the downlink board 303 including the target output port. The downlink board may also be referred to as a downlink interface board. The downlink board 303 includes a plurality of output ports. The downlink board 303 receives the data packet from the switch fabric 302. The downlink board may perform processing such as buffer management and encapsulation on the received data packet, and then send the data packet to a next node through the target output port.

It may be understood that the router shown in FIG. 3 shows only one uplink board 301 and one downlink board 303. In some embodiments, the router may include a plurality of uplink boards and/or a plurality of downlink boards.

Unless otherwise specified, a time (for example, an actual time or a maximum time) or the like in this embodiment of this application is a time of the data packet inside the network device, and does not include a time of transmitting the data packet between network devices.

Figure 4:
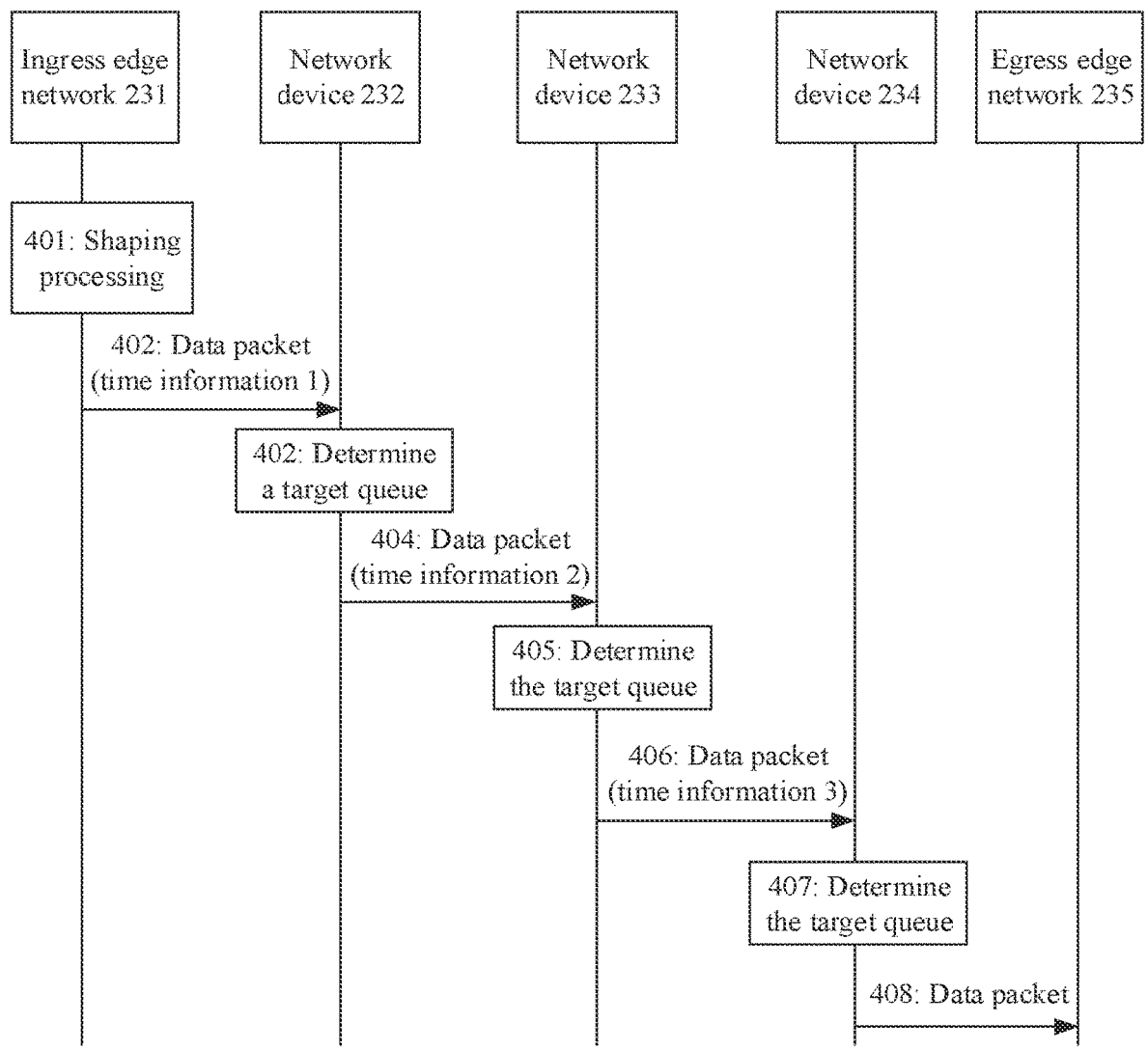
FIG. 4 is a schematic flowchart of a data packet scheduling method according to an embodiment of this application.

FIG. 4 is a schematic flowchart of a data packet scheduling method according to an embodiment of this application. FIG. 4 describes a data packet scheduling method according to an embodiment of this application with reference to FIG. 2. It is assumed that the data packet scheduling method in this embodiment of this application is applied to the core network 230 in FIG. 2.

The ingress edge device 231 may receive a plurality of flows. The ingress edge device 231 processes each of the plurality of flows in a same manner. It is assumed that paths of the plurality of flows received by the ingress edge device 231 sequentially pass through the ingress edge device 231, the network device 232, the network device 233, the network device 234, and the egress edge device 235. The ingress edge device 231 is a first network device in the core network 230 that the plurality of flows enter. Therefore, the ingress edge device 231 may also be referred to as a first-hop network device or a start-hop network device. Correspondingly, the network device 232 is a second-hop network device, the network device 233 is a third-hop network device, the network device 234 is a fourth-hop network device, and the egress edge device 235 is a fifth-hop network device.

For an $i^{th}$ flow in the plurality of flows, an average bandwidth reserved by an output port of each network device on a path for the $i^{th}$ flow is $r_i$. The plurality of flows meet a traffic model, and the traffic model may be represented by using the following formula:

$$A_i(t)=r_i \times t+B_i \quad \text{(Formula 4.1)}$$

t is a time, $A_i(t)$ is a total data traffic volume of the $i^{th}$ flow within the t time, and $B_i$ is a maximum burst degree of the $i^{th}$ flow.

For ease of description, the following uses a target flow as an example to describe how a network device in a network processes a received flow. The target flow is any one of the plurality of flows received by the ingress edge device 231.

401: The ingress edge device 231 may shape the target flow, so that the target flow entering the core network 230 meets a requirement of the traffic model shown in the formula 4.1.

A manner in which the ingress edge device 231 shapes the target flow may use an existing shaping algorithm, for example, a leaky bucket algorithm or a token bucket algorithm.

A unit responsible for shaping the target flow in the ingress edge device 231 may be referred to as a shaping unit.

402: The ingress edge device 231 sends a data packet in the target flow to a next-hop network device (that is, the network device 232). The ingress edge device 231 further sends time information to the network device 232.

A data packet obtained after shaping processing enters an output queue, and the data packet may be sent to the network device 232 by scheduling the output queue. In the ingress edge device 231, a unit responsible for managing the output queue may be referred to as a dequeue unit, and a unit responsible for scheduling the output queue may be referred to as a scheduling unit.

For ease of description, the time information sent by the ingress edge device 231 to the network device 232 is referred to as time information 1 below.

For better understanding of the technical solutions in this application, the following describes some concepts related to the technical solutions in this application.

1. Reference Moment

Each of network devices (for example, the network device 232, the network device 233, the network device 234, and the egress edge device 235) other than the ingress edge device 231 in the core network 230 has a polling scheduling queue system, and the queue system includes a plurality of queues. The network device may determine, based on one moment, a queue to which a received data packet is added. This moment may be referred to as the reference moment.

In addition, in some embodiments, the ingress edge device 231 may also have a polling scheduling queue system. In this case, the ingress edge device 231 may also determine, based on one moment, a queue to which a received data packet is added. This moment may also be referred to as the reference moment.

In some other embodiments, the ingress edge device 231 may not have a queue system. In this case, the ingress edge device 231 may first input a data packet to an output queue system when outputting the data packet. A moment at which the data packet enters the output queue system may also be referred to as the reference moment.

In some other embodiments, regardless of whether the foregoing polling scheduling queue system exists on the ingress edge device 231, the reference moment of the ingress edge device 231 may also be another moment. For example, the reference moment of the ingress edge device 231 may be a moment at which the data packet is received. For another example, the reference moment of the ingress edge device 231 may be a moment at which the data packet is output from the ingress edge device 231.

For ease of description, in the following embodiments, it is assumed that the ingress edge device 231 does not have a polling scheduling queue system, and the reference moment of the ingress edge device 231 is a moment at which the ingress edge device 231 enters an output queue system.

A reference moment at which an $n^{th}$ network device (n is a positive integer greater than or equal to 1) in the network is used to determine to add the data packet to a queue in a queue system may be referred to as a reference moment n. For example, a reference moment 1 is a reference moment at which the data packet enters an/a (output) queue system of the ingress edge device; a reference moment 2 is a reference moment at which the data packet enters a queue in a queue system of the network device 232; and a reference moment 3 is a reference moment at which the data packet enters a queue in a queue system of the network device 233.

2. Transmit Device and Receive Device

The transmit device is a network device that sends a data packet, and the receive device is a network device that receives a data packet. For example, if the ingress edge device 231 sends the data packet to the network device 232, the transmit device is the ingress edge device 231, and the receive device is the network device 232. For another example, if the network device 232 sends the data packet to the network device 233, the network device 232 is the transmit device, and the network device 233 is the receive device.

In addition, a reference moment of the transmit device is a reference moment at which the data packet enters a queue in a queue system of the transmit device. Correspondingly, a reference moment of the receive device is a reference moment at which the data packet enters a queue in a queue system of the receive device. For example, if the transmit device is the ingress edge device 231, the reference moment of the transmit device is a reference moment 1; or if the transmit device is the network device 232, the reference moment of the transmit device is a reference moment 2. For another example, if the receive device is the network device 232, the reference moment of the receive device is a reference time 2; or if the receive device is the network device 233, the reference moment of the receive device is a reference time 3.

3. Theoretical Time Upper Limit

The theoretical time upper limit is calculated based on a network calculus (theory to obtain a maximum time required by the network device to process the data packet. In other words, a time for processing the data packet by the network device is not greater than the theoretical time upper limit. The theoretical time upper limit does not include a delay of transmitting the data packet between network devices.

A theoretical time upper limit from the transmit device to the receive device refers to a theoretical time upper limit from a reference moment of the transmit device to a reference moment of the receive device. The theoretical time upper limit may also be referred to as a theoretical time upper limit associated with the transmit device. If the transmit device is the ingress edge device 231, the theoretical time upper limit associated with the transmit device may be referred to as a theoretical time upper limit associated with the ingress edge device 231. If the transmit device is the network device 232, the theoretical time upper limit associated with the transmit device may be referred to as a theoretical time upper limit associated with the network device 232.

A theoretical time upper limit n is a theoretical time upper limit of the network device through which the data packet passes from a reference moment 1 to a reference moment n+1, where n is a positive integer greater than or equal to 1. For example, a theoretical time upper limit 1 is a theoretical time upper limit of the network device through which the data packet passes from a reference moment 1 to a reference moment 2. For another example, a theoretical time upper limit 2 is a theoretical time upper limit of the network device through which the data packet passes from a reference moment 1 to a reference moment 3.

The theoretical time upper limit 1 is equal to the theoretical time upper limit associated with the ingress edge device 231, and the theoretical time upper limit 2 is equal to a sum of the theoretical time upper limit associated with the ingress edge device 231 and the theoretical time upper limit associated with the network device 232.

4. Actual Time

An actual time n is an actual time of the data packet inside the network device from a reference moment 1 to a moment n+1. The moment n+1 is a moment at which the data packet enters a queue system of an (n+1)$^{th}$ network device. For example, a moment at which the data packet enters a queue system of a second network device (that is, the network device 232) may be referred to as a moment 2, and a moment at which the data packet enters a queue system of a third network device (that is, the network device 233) may be referred to as a moment 3.

An actual time 1 is an actual time of the data packet inside the network device from a reference moment 1 to a moment 2. An actual time 2 is an actual time of the data packet inside the network device from a reference moment 1 to a moment 3.

An actual time associated with the transmit device refers to an actual time of the network device through which the data packet passes from a reference moment of the transmit device to a moment at which the data packet enters a queue system of the receive device. For example, assuming that the transmit device is the ingress edge device 231, an actual time associated with the ingress edge device 231 is an actual time of the network device through which the data packet passes from a reference moment 1 to a moment 2. For another example, assuming that the transmit device is the network device 232, an actual time associated with the network device 232 is an actual time of the network device through which the data packet passes from a reference moment 2 to a moment 3.

It can be learnt that the actual time 1 is equal to the actual time associated with the ingress edge device 231. The actual time 2 is equal to a sum of the actual time 1 and the actual time associated with the network device 232. An actual time 3 is equal to a sum of the actual time 2 and the actual time associated with the network device 233.

Similar to the theoretical time upper limit, the actual time does not include a delay of transmitting the data packet between network devices either.

5. Remaining Processing Time

A remaining processing time n is a difference between the theoretical time upper limit n and the actual time n. For example, a remaining processing time 1 is a difference between the theoretical time upper limit 1 and the actual time 1.

A remaining processing time associated with the transmit device is a difference between the theoretical time upper limit associated with the transmit device and the actual time associated with the transmit device. For example, a remaining processing time associated with the ingress edge device 231 is a difference between the theoretical time upper limit associated with the ingress edge device 231 and the actual time associated with the ingress edge device 231.

6. Sending Moment and Receiving Moment

A sending moment n is a moment at which the data packet is output from an n$^{th}$ network device, and a receiving moment n is a moment at which an n$^{th}$ network device receives the data packet.

For example, a sending moment 1 is a moment at which the data packet is output from the first network device (that is, the ingress edge device 231), and a sending moment 2 is a moment at which the data packet is output from the second network device (that is, the network device 232).

For another example, a receiving moment 2 is a moment at which the network device 232 receives the data packet, and a receiving moment 3 is a moment at which the network device 233 receives the data packet.

A person skilled in the art may understand that time precision that can be identified and expressed by the network device such as a router is limited. A moment precision is the same as the precision that can be identified and expressed by network devices such as the router. An actual occurrence time of the moment may be any time within a precision range. For example, if the precision that can be identified and expressed by the network device such as the router is 1 nanosecond (ns), the moment precision is also 1 ns. For example, if the sending moment 1 is 1 microsecond (µs) 1 ns, an actual time of the sending moment 1 may be any time from 1 µs1 ns to 1 µs2 ns, for example, 1 µs1.1 ns or 1 µs1.99 ns.

The moment precision may also be a preset precision range. For example, if a preset precision is 10 µs, the moment precision is also 10 µs. An actual occurrence time of the moment may be any time within a precision range. For example, if the sending moment 1 is 13 µs, an actual time of the sending moment 1 may be any time from 13 µs to 23 µs, for example, 15 µs, 16 µs, or 18 µs.

The moment may also be represented by using a predefined number. The time is divided into a plurality of moments by a predefined granularity, and each moment is represented by a number. For example, 24 hours may be divided into 1440 moments at a granularity of one minute, and each moment is represented by an Arabic numeral number. For example, 0 indicates 00:00 to 00:01, and 1 indicates 00:01 to 00:02, and by analogy. If the sending moment 1 is 16, an actual time of the sending moment 1 may be any time from 0:16 to 0:17, for example, 0:16:08, 0:16:31, or 0:16:59.

Time information 1 indicates a remaining processing time 1, and the remaining processing time 1 is a difference between the theoretical time upper limit 1 and the actual time 1.

As described above, a start moment of the theoretical time upper limit 1 is the moment 1, and an end moment is the reference moment 2. Actually, a start moment of the actual time 1 is the reference moment 1, and an end moment of the actual time 1 is the moment 2.

In the worst case, the difference between the theoretical time upper limit 1 and the actual time 1 is 0.

The queue system of the network device 232 includes a plurality of queues, and the plurality of queues are scheduled in a pooling manner. The plurality of queues are always enabled and scheduled in polling mode. The plurality of queues are in a one-to-one correspondence with a plurality of moments. This moment may be referred to as a time stamp (stamp).

Figure 5:
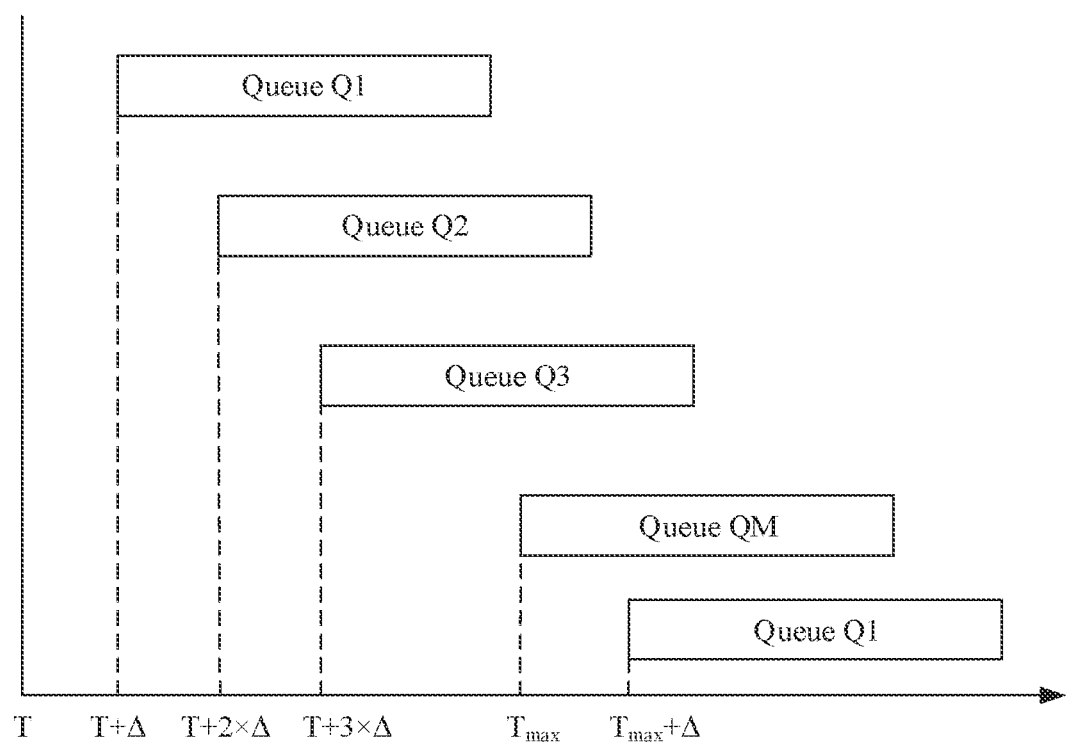
FIG. 5 shows correspondences between M queues and M moments.

FIG. 5 shows correspondences between M queues and M moments. In the embodiment shown in FIG. 5, M is a positive integer greater than 3.

A time interval between any two adjacent queues (for example, a queue Q1 and a queue Q2, or a queue Q2 and a queue Q3) in the queue Q1 to a queue QM shown in FIG. 5 is $\Delta$. Assuming that a start moment is T, a moment corresponding to the queue Q1 is T+$\Delta$, a moment corresponding to the queue Q2 is T+2×$\Delta$, a moment corresponding to the queue Q3 is T+3×$\Delta$, and by analogy, a moment corresponding to the queue QM is $T_{max}$. After a system time exceeds the moment $T_{max}$, the M queues continue to cycle at the time interval $\Delta$. For example, a time interval between a moment corresponding to the queue Q1 and a moment corresponding to the queue QM is $\Delta$. In other words, after the queue Q1 is scheduled this time, a moment corresponding to the queue Q1 next time is $T_{max}$+$\Delta$. Similarly, a time interval between a moment corresponding to the queue Q2 and a moment corresponding to the queue Q1 is $\Delta$. In other words, a moment corresponding to the queue Q2 is $T_{max}$+2×$\Delta$, and by analogy.

The network device 232 determines, based on the reference moment 2, to add the data packet into a queue. It is assumed that the queue that needs to be added to the reference queue 2 is referred to as a target queue, and a moment corresponding to the target queue is referred to as a target moment. In some embodiments, the reference moment 2 and the target moment may meet the following relationship: The reference moment 2 is not greater than the target moment, and a moment corresponding to any queue is not included between the reference moment and the target moment. In other words, two cases may occur at the reference moment 2. Case 1: The reference moment 2 is between two moments corresponding to the two queues. In this case, the target queue is a queue whose corresponding moment is later than the reference moment 2. For example, FIG. 5 is used as an example, and the reference moment 2 is between T+$\Delta$ and T+2×$\Delta$. In this case, the target queue is the queue Q2. Case 2: The reference moment 2 is exactly the same as a moment corresponding to a queue. In this case, the target queue is a queue corresponding to a moment of the reference moment 2. FIG. 5 is further used as an example. Assuming that the reference moment 2 is T+2×$\Delta$, the target queue is the queue Q2.

In some other embodiments, the target moment may be determined in the following manner: determining a sum of the reference moment 2 and one preset duration. For ease of description, a sum of the reference moment 2 and the preset duration may be referred to as a reference moment 2'. The preset duration may be one preset duration, or may be α time intervals $\Delta$, where α is a preset positive integer. The reference moment 2' and the target moment meet the following relationship: The reference moment 2' is not greater than the target moment, and a moment corresponding to any queue is not included between the reference moment and the target moment 2'. In other words, two cases may occur at the reference moment 2'. Case 1: The reference moment 2' is between two moments corresponding to the two queues. In this case, the target queue is a queue whose corresponding moment is later than the reference moment 2'. For example, FIG. 5 is used as an example, and the reference moment 2' is between T+$\Delta$ and T+2×$\Delta$. In this case, the target queue is the queue Q2. Case 2: The reference moment 2' is exactly the same as a moment corresponding to a queue. In this case, the target queue is a queue corresponding to a moment of the reference moment 2'. FIG. 5 is further used as an example. Assuming that the reference moment 2' is T+2×$\Delta$, the target queue is the queue Q2. Optionally, for data packets of a same flow, values of α may be the same, and for data packets of different flows, values of α may be different.

The queue system may be implemented on a downlink board of the network device 232, or may be implemented on an uplink board of the network device 232. A unit that implements the queue system in the network device 232 may be referred to as a queue system unit.

Figure 6:
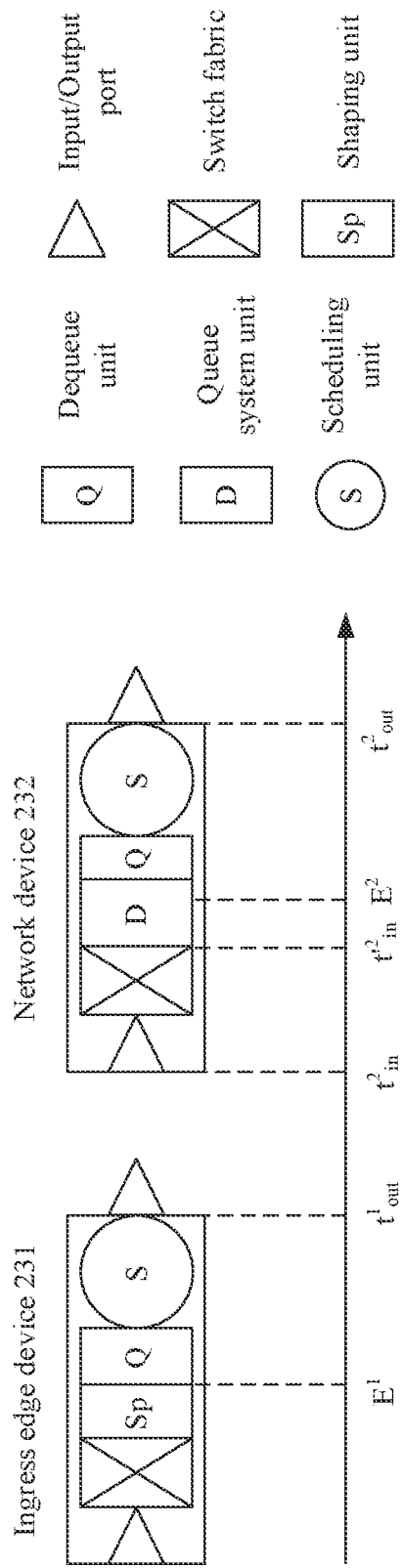
FIG. 6 shows a sequence diagram of processing a packet by an ingress edge device 231 and a network device 232.

FIG. 6 shows a sequence diagram of processing the packet by the ingress edge device 231 and the network device 232. FIG. 6 is a sequence diagram of implementing the queue system on the downlink board.

As shown in FIG. 6, the data packet is sharped at the reference moment 1, and enters an output queue. The data packet is output from the ingress edge device 231 at the sending moment 1. In FIG. 6, the data packet is input to the network device 232 at the receiving moment 2. The data packet leaves the switch fabric of the network device 232 at the moment 2 and enters the queue system. The network device 232 selects, based on the reference moment 2, a target queue from the plurality of queues included in the queue system. The data packet is output from the network device 232 at the sending moment 2.

It may be understood that a dequeue unit Q and a queue system unit D shown in FIG. 6 and subsequent accompanying drawings are merely different units logically divided. In a specific device form, the dequeue unit Q and the queue system unit D may be a same physical unit.

In FIG. 6, the reference moment 1 is denoted as $E^1$, the sending moment 1 is denoted as $t^1_{out}$, the receiving moment 2 is denoted as $t^2_{in}$, and the moment 2 is denoted as $t'^2_{in}$. The reference moment 2 is denoted as $E^2$, and the sending moment 2 is denoted as $t^2_{out}$.

The theoretical upper time limit 1 is a theoretical upper time limit for a period of the data packet at the ingress edge device 231 and the network device 232 from the moment $E^1$ to the moment $E^2$. The theoretical time upper limit 1 does not include a transmission delay of the data packet from the ingress edge device 231 to the network device 232.

Similarly, the actual time 1 is an actual time of the data packet at the ingress edge device 231 and the network device 232 from the moment $E^1$ to the moment $t'^2_{in}$. The actual time 1 does not include a transmission delay of the data packet from the ingress edge device 231 to the network device 232.

Figure 7:
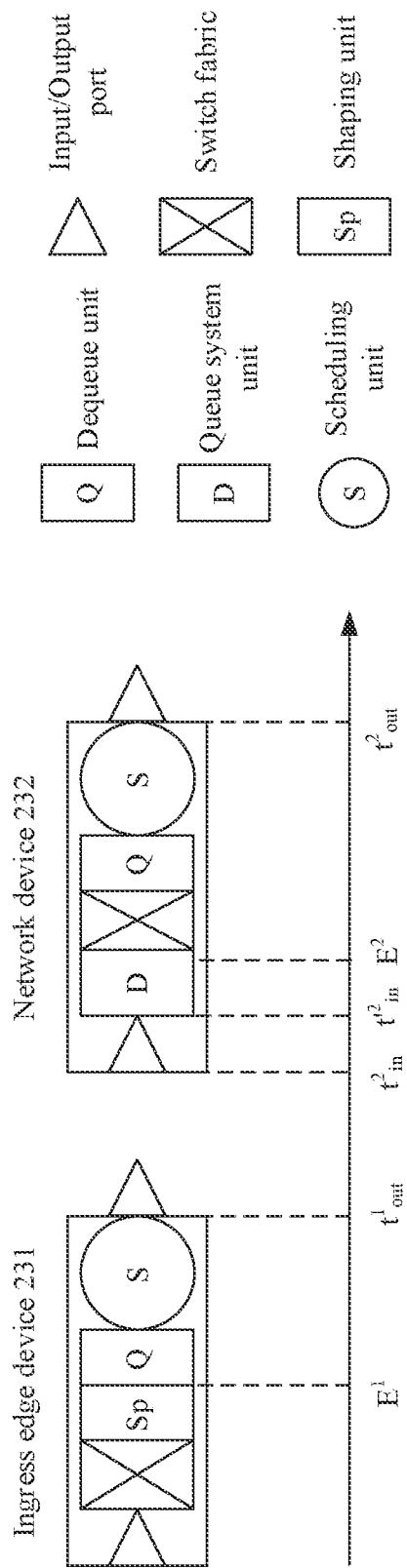
FIG. 7 shows a sequence diagram of processing a packet by an ingress edge device 231 and a network device 232.

FIG. 7 shows a sequence diagram of processing the packet by the ingress edge device 231 and the network device 232. FIG. 7 is a sequence diagram of implementing the queue system on the uplink board.

As shown in FIG. 7, the data packet is sharped at the reference moment 1, and enters an output queue. The data packet is output from the ingress edge device 231 at the sending moment 1. The data packet is input to the network device 232 at the receiving moment 2. The data packet enters the queue system at the moment 2. The network device 232 selects, based on the reference moment 2, a target queue from the plurality of queues included in the queue system. The data packet is output from the network device 232 at the sending moment 2.

In FIG. 7, the reference moment 1 is denoted as $E^1$, the sending moment 1 is denoted as $t^1_{out}$, the receiving moment 2 is denoted as tin, and the moment 2 is denoted as $t^2_{in}$. The reference moment 2 is denoted as $E^2$, and the sending moment 2 is denoted as $t^2_{out}$.

Similar to the solution in which the downlink board implements the queue system shown in FIG. 6, the theoretical upper time limit 1 is a theoretical upper time limit for a period of the data packet at the ingress edge device 231 and the network device 232 from the moment $E^1$ to the moment $E^2$. The theoretical time upper limit 1 does not include a transmission delay of the data packet from the ingress edge device 231 to the network device 232.

Similarly, the actual time 1 is an actual time of the data packet at the ingress edge device 231 and the network device 232 from the moment $E^1$ to the moment $t^2_{in}$. The actual time 1 does not include a transmission delay of the data packet from the ingress edge device 231 to the network device 232.

For ease of description, $D^1_{max}$ is used below to represent the theoretical time upper limit associated with the ingress edge device 231, and $D^1_r$ is used below to represent the actual time associated with the ingress edge device 231. The actual time associated with the ingress edge device 231 may be expressed by using the following formula:

$$D^1_r = (t^1_{res} - E^1) + (t^2_{in} - t^2_{in}) \quad \text{(Formula 4.2)}$$

The remaining processing time associated with the ingress edge device may be represented by $D'^1_{res}$. $D'^1_{res}$, $D^1_{max}$, and $D^1_r$ meet the following relationship:

$$D'^1_{res} = D^1_{max} - D^1_r \quad \text{(Formula 4.3)}$$

If the formula 4.2 is substituted into the formula 4.3, the following formula may be obtained:

$$D'^1_{res} = D^1_{max} - (t^1_{out} - E^1) - (t^2_{in} - t^2_{in}) \quad \text{(Formula 4.4)}$$

Because the ingress edge device 231 and the network device 232 are first two network devices after the data packet enters the network, the remaining processing time associated with the ingress edge device 231 is equal to the remaining processing time 1. The remaining processing time 1 may be denoted as $D^1_{res}$. $D'^1_{res} = D^1_{res}$.

As described above, the time information 1 indicates the remaining processing time 1. The network device 232 may learn of $t^2_{in}$ and $t^2_{in}$ by itself. Therefore, the time information 1 may indicate a difference between the theoretical time upper limit 1 and the actual time 1 by indicating a difference between $t^1_{out}$ and $E^1$.

In some embodiments, the time information 1 may include first time indication information. The first time indication information indicates a time from a reference moment of the transmit device to a moment at which the data packet is output from the transmit device. Subsequently, the network device also sends time information including the first time indication information.

To distinguish from first time indication information subsequently sent by the network device, the first time indication information in the time information 1 is referred to as first time indication information 1 below.

For the first time indication information 1, the transmit device is the ingress edge device 231. Therefore, the first time indication information 1 indicates a time from $E^1$ to $t^1_{out}$.

In some embodiments, the first time indication information 1 includes a value at the moment $t^1_{out}$ and a value at the moment $E^1$. After receiving the first time indication information 1, the network device 232 may calculate a difference between $t^1_{out}$ and $E^1$ by itself based on the value at the moment $t^1_{out}$ and the value at the moment $E^1$.

In some other embodiments, the first time indication information 1 may directly carry the difference between $t^1_{out}$ and $E^1$. In other words, the ingress edge device 231 may calculate a difference between $t^1_{out}$ and $E^1$, and send the difference between $t^1_{out}$ and $E^1$ to the network device 232 by using the first time indication information 1.

In some embodiments, the time information 1 may further include second time indication information. The second time indication information indicates an accumulated remaining processing time. If the transmit device is an $n^{th}$ network device in the network, the accumulated remaining processing time is a remaining processing time n−1. In other words, the accumulated remaining processing time is a difference between a theoretical time upper limit n−1 and an actual time n−1. The theoretical time upper limit n−1 is a theoretical time upper limit of the network device through which the data packet passes from a reference moment 1 to a reference moment n. The actual time is an actual time of the network device through which the data packet passes from a reference moment 1 to a moment n. In other words, the theoretical processing time upper limit n−1 is a theoretical processing time upper limit of the network device through which the data packet passes from the reference moment 1 to a reference moment of the transmit device, and the actual time n−1 is a time from the reference moment 1 to a moment at which the data packet enters the queue system of the transmit device.

Similarly, to distinguish from second time indication information subsequently sent by the network device, the second time indication information in the time information 1 is referred to as second time indication information 1 below.

For the second time indication information 1, the transmit device is the ingress edge device 231, that is, the first network device. Therefore, n=1, and the accumulated remaining processing time is a remaining processing time 0. A start moment and an end moment of the theoretical processing time upper limit 0 used to calculate the remaining processing time 0 are the same, and are both the reference moment 1. The start moment of the actual time 0 is the reference moment 1, and the end moment is also the reference moment 1 (an enqueue reference moment in the ingress edge device 231 is the same as a moment of entering the queue system). Therefore, a value indicated by the second time indication information 1 is 0. The remaining processing time 0 may be represented by $D^0_{res}$.

In some embodiments, if the value indicated by the second time indication information is 0, the second time indication information may directly carry the indicated value, that is, 0.

In some other embodiments, if the value indicated by the second time indication information is 0, the time information may not carry the second time indication information, or the value of the second time indication information is a preset fixed value. If the time information received by the network device does not include the second time indication information, or a value of the second time indication information is a preset fixed value, the network device may determine that a value of the remaining processing time is 0 until the reference moment of the transmit device.

In some embodiments, the time information 1 may further include third time indication information. The third time indication information indicates a theoretical time upper limit associated with the transmit device.

Similarly, to distinguish from third time indication information subsequently sent by the network device, the third time indication information in the time information 1 is referred to as third time indication information 1 below.

For the third time indication information 1, the transmit device is the ingress edge device 231, and the receive device is the network device 232. Therefore, the third time indication information 1 indicates, from the reference moment 1 to the reference moment 2, a theoretical processing time upper limit of the network device through which the data packet passes, that is, $D^1_{max}$.

In some other embodiments, $D^1_{max}$ may be preconfigured in the network device 232 or a preset default value. In this case, the time information 1 may not include the third time indication information 1 indicating $D^1_{max}$.

403: The network device 232 determines a target queue from a plurality of queues based on the moment $t^2_{in}$ and the time information 1, and adds the data packet to the target queue.

As described above, the network device 232 selects the target queue from the plurality of queues based on the reference moment 2, that is, $E^2$. For a specific selection manner, refer to the foregoing description. For brevity, details are not described herein again. The following describes how to calculate $E^2$.

$E^2$ is a sum of $t^2_{in}$ and the remaining processing time 1. The remaining processing time 1 is a sum of the remaining processing time 0 indicated by the time information 1 and the remaining processing time associated with the ingress edge device 231, that is, meets the following formula:

$$D^1_{res} = D^0_{res} + D'^1_{res} \quad \text{(Formula 4.5)}$$

Because $D^0_{res}$ is equal to 0, $D^1_{res}$ $D'^1_{res}$.

In this case, $E^2$, $t^2_{in}$, and $D^1_{res}$ meet the following formula:

$$E^2 = t^2_{in} + D'^1_{res} \quad \text{(Formula 4.6)}$$

The following formula may be obtained by combining the formula 4.4 used to calculate $D'^1_{res}$ with the formula 4.6:

$$E^2 = D^1_{max} - (t^1_{out} - E^1) + t^2_{in} \quad \text{(Formula 4.7)}$$

It can be learned that the network device 232 may determine $E^2$ based on the moment $t^2_{in}$ and the received time information 1.

404: The network device 232 sends the data packet to a next-hop network device (that is, the network device 233), and the network device 232 further sends the time information to the network device 233.

After adding the data packet to the target queue, the network device 232 may schedule the plurality of queues according to a scheduling rule.

Optionally, in some embodiments, the scheduling rule used by the network device 232 is rolling scheduling. In other words, the plurality of queues is scheduled in turn in time. When a queue is polled, another queue cannot be scheduled before the queue is empty. To implement the preceding feature, a large value (Quantum) can be set. If Quantum is set to a large value, when a queue is polled, another queue cannot be scheduled before the queue is empty.

Specifically, the network device 232 polls the plurality of queues in a ring manner. If the to-be-polled queue is not empty, the queue is scheduled until the queue is empty. If the queue is empty, the queue is skipped. If the downlink board is used for implementation, the scheduled data packet is input to the output queue, and the dequeue unit is responsible for processing. A subsequent processing manner is the same as an existing data packet processing manner. For brevity, details are not described herein again. If the uplink board is used for implementation, the scheduled data packet enters the switching system. A procedure of entering the switching system and a subsequent processing procedure are the same as an existing data packet processing manner. For brevity, details are not described herein again.

The time information sent by the network device 232 to the network device 233 may be referred to as time information 2. The time information 2 is different from the time information 1.

The time information 2 indicates the remaining processing time 2. The remaining processing time 2 is a difference between the theoretical time upper limit 2 and the actual time 2.

A start moment of the theoretical time upper limit 2 is the reference moment 1, and an end moment of the theoretical time upper limit 2 is the reference moment 3. The reference time 3 may be represented by $E^3$.

A time from the reference moment 2 being as the start moment to the reference moment 3 being as the end moment is the theoretical upper time limit associated with the network device 233.

If $D^2_{max}$ represents the theoretical upper time limit associated with the network device 232, and $D^1_{max}$ represents the theoretical upper time limit associated with the ingress edge device 231, the theoretical upper time limit 2 is a sum of $D^1_{max}$ and $D^2_{max}$.

A start moment of the actual time 2 is the reference moment 1, and an end moment of the actual time 2 is the moment 3, which may be represented by $t^3_{in}$.

Similar to that the time information 1 indicates the remaining processing time 1, the network device 233 may learn of $t^3_{in}$ and $t^3_{in}$ by itself. $t^3_{in}$ indicates the receiving time 3. Therefore, the time information 2 may indicate the remaining processing time 2 by indicating $t^2_{out}$ and $E^2$ and the remaining processing time 1, where $t^2_{out}$ represents the sending moment 2.

In some embodiments, the time information 2 may include first time indication information. The first time indication information included in the time information 2 may be referred to as first time indication information 2.

For the first time indication information 2, the transmit device is the network device 232. Therefore, the first time indication information 2 indicates a time from $E^2$ to $t^2_{out}$. Similar to the first time indication information 1, the second time indication information 2 may carry a value of the moment $t^2_{out}$ and a value of the moment $E^2$, or may carry a difference between $t^2_{out}$ and $E^2$.

In some embodiments, the time information 2 may include second time indication information. The second time indication information included in the time information 2 may be referred to as second time indication information 2.

For the second time indication information 2, the transmit device is the network device 232. Therefore, a start moment of a theoretical processing time upper limit corresponding to the remaining processing time indicated by the second time indication information 2 is the reference moment 1, and an end moment is the reference moment 2. A start moment of an actual time corresponding to the remaining processing time indicated by the second time indication information 2 is the reference moment 1, and an end moment is the moment 2. It can be seen that an accumulated remaining processing time indicated by the second time indication information 2 is the remaining processing time 1, that is, $D^1_{res}$.

In some embodiments, the time information 2 may include third time indication information. The third time indication information included in the time information 2 may be referred to as third time indication information 2.

For the third time indication information 2, the transmit device is the network device 232, and the receive device is the network device 233. Therefore, the third time indication information 2 indicates, from the reference moment 2 to the reference moment 3, a theoretical processing time upper limit of the network device through which the data packet passes, that is, the theoretical upper limit of time associated with the network device 232, that is, $D^2_{max}$.

Similarly, if $D^2_{max}$ is a preconfigured value or a preset value, the time information 2 may not carry the third time indication information 2.

405: The network device 233 determines a target queue from a plurality of queues based on the moment $t^3_{in}$ and the time information 2, and adds the data packet to the target queue.

A manner in which the network device 233 determines the target queue is similar to a manner in which the network device 232 determines the target queue.

The reference moment 3 is a sum of the moment $t^3_{in}$ and the remaining processing time 2, that is, $$E^3 = t^3_{in} + D^2_{res} \quad \text{(Formula 4.8)}$$

$D^2_{res}$ may be determined according to the following formula:

$$D^2_{res} = D^1_{res} + D'^2_{res} \quad \text{(Formula 4.9)}$$

$D'^2_{res}$ may be determined according to the following formula:

$$D'^2_{res} = D^2_{max} - (t^2_{out} - E^2) - (t^3_{in} - t^3_{in}) \quad \text{(Formula 4.10)}$$

With reference to the formula 4.9 and the formula 4.10, it may be obtained that:

$$D^2_{res} = D^1_{res} + [D^2_{max} - (t^2_{out} - E^2) - (t^3_{in} - t^3_{in})] \quad \text{(Formula 4.11)}$$

With reference to the formula 4.8 and the formula 4.11, it may be obtained that:

$$E^3 = D^1_{res} + [D^2_{max} - (t^2_{out} - E^2) + t^3_{in})] \quad \text{(Formula 4.12)}$$

It can be learned that the network device 233 determines $E^3$ based on the moment $t^3_{in}$ and the time information 2. After determining the reference moment 3, the network device 233 may determine the target queue based on the reference moment 3, and add the data packet to the determined target queue. A manner of scheduling the target queue is the same as that in the foregoing embodiment. For brevity, details are not described herein again.

Figure 8:
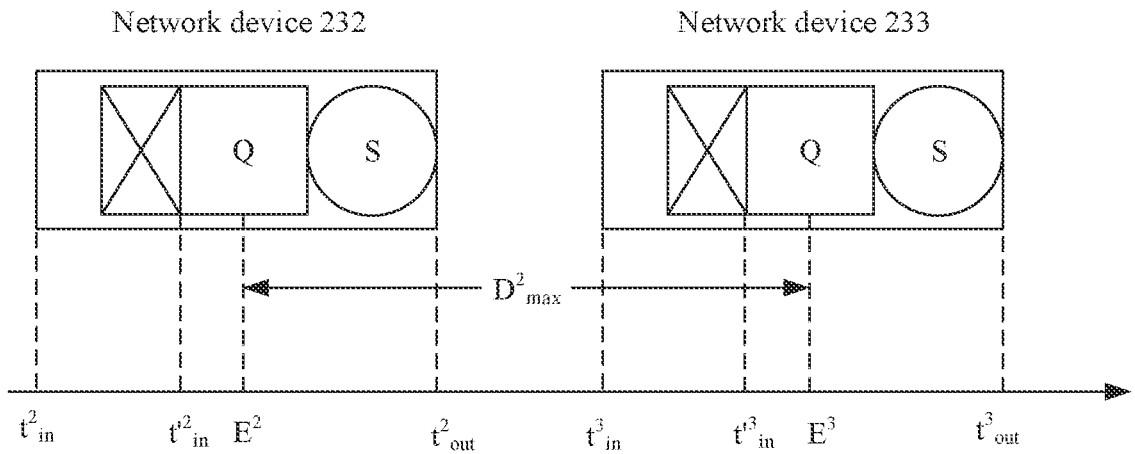
FIG. 8 shows a sequence diagram of processing a packet by a network device 232 and a network device 233.

FIG. 8 shows a sequence diagram of processing the packet by the network device 232 and the network device 233. FIG. 8 is a sequence diagram of implementing the queue system on the downlink board.

Figure 9:
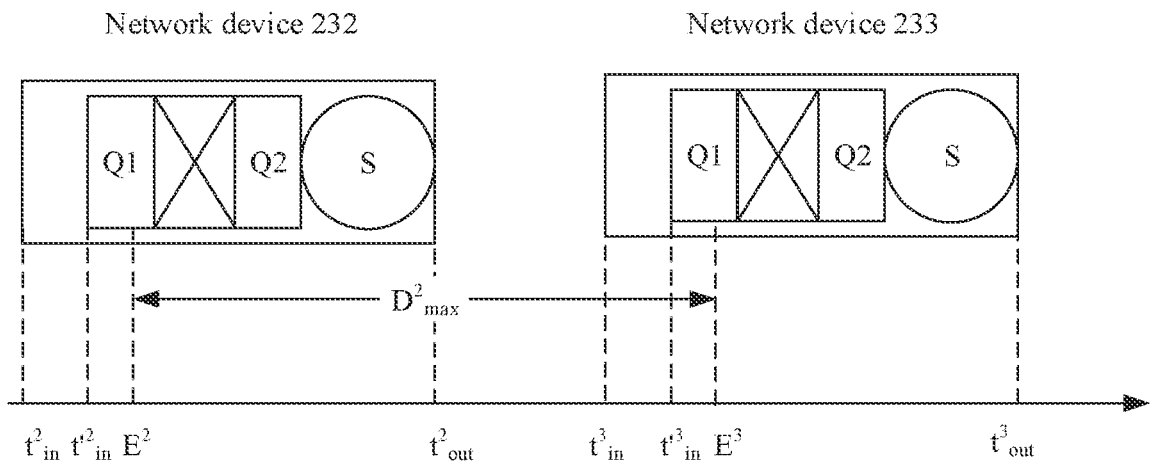
FIG. 9 shows a sequence diagram of processing a packet by a network device 232 and a network device 233.

FIG. 9 shows a sequence diagram of processing the packet by the network device 232 and the network device 233. FIG. 9 is a sequence diagram of implementing the queue system on the uplink board.

406: The network device 233 may send the received data packet to a next-hop network device (that is, the network device 234). The network device 233 may further send the time information to the network device 234.

407: The network device 234 determines a target queue from a plurality of queues based on the receiving moment 4 and the received time information, and adds the data packet to the target queue.

A specific implementation of step 406 is similar to that of step 404, and a specific implementation of step 407 is similar to that of step 405. For brevity, details are not described herein again.

408: The network device 234 sends the data packet to the egress edge device 235, and the egress edge device 235 sends the data packet to the user equipment 221 by using the edge network 220. The network device 234 may further send the time information to the egress edge device 235. The egress edge device 235 may determine a target queue from a plurality of queues based on the receiving moment 5 and the received time information, and adds the data packet to the target queue.

A specific implementation of step 408 is similar to that of step 404 and step 405. For brevity, details are not described herein again.

Figure 10:
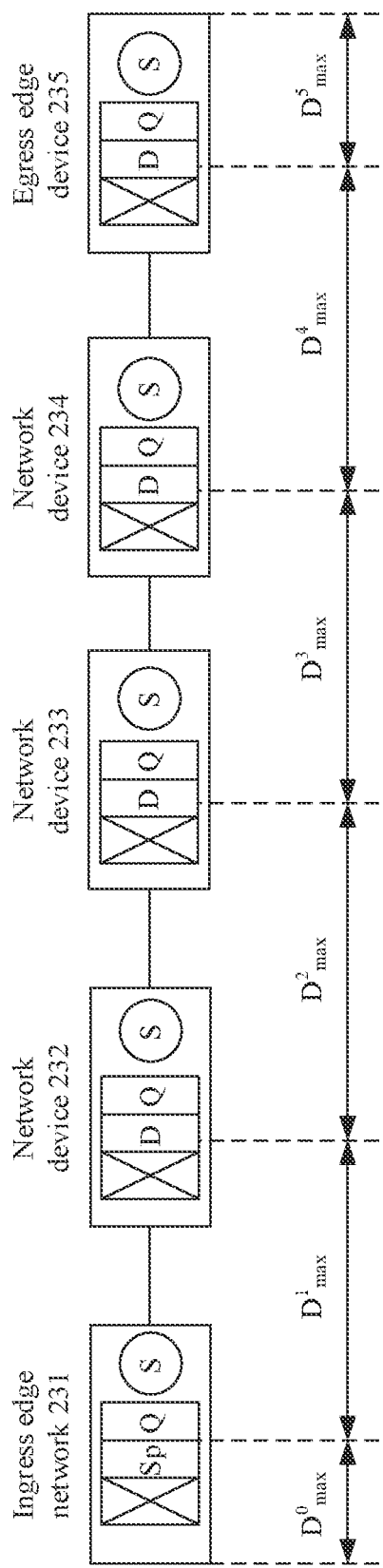
FIG. 10 is a schematic diagram of $D_{max}$ corresponding to each network device in a core network 230 when a cyclic queue is implemented on a downlink board.
Figure 11:
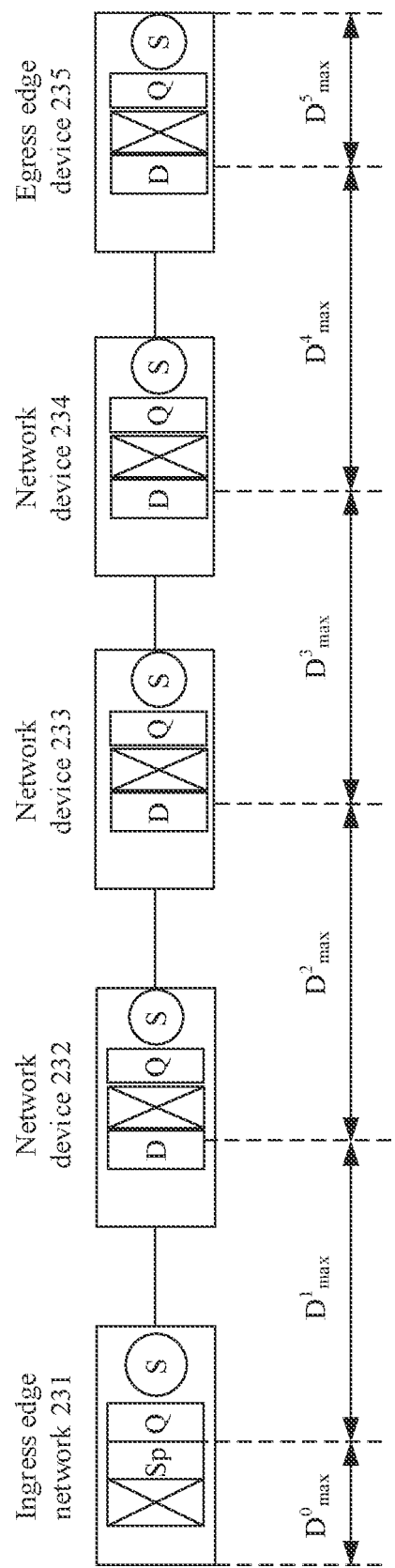
FIG. 11 is a schematic diagram of $D_{max}$ corresponding to each network device in a core network 230 when a cyclic queue is implemented on an uplink board.

FIG. 10 is a schematic diagram of $D_{max}$ corresponding to each network device in a core network 230 when a cyclic queue is implemented on a downlink board;

FIG. 11 is a schematic diagram of $D_{max}$ corresponding to each network device in the core network 230 when a cyclic queue is implemented on the uplink board.

$D^0_{max}$ in FIG. 10 and FIG. 11 indicates a theoretical time upper limit of a processing delay on the first hop and a shaping delay. If the $E^1$ is set at a moment at which the ingress edge device 231 receives the data packet, $D^0_{max}$ is included in $D^1_{max}$. $D^5_{max}$ represents a theoretical time upper limit from $E^5$ to $t^5_{out}$ (that is, a moment at which the data packet is output from the egress edge device 235).

When the data packet enters the network from the ingress edge device and leaves the network from the egress edge device, the following situations may occur:

Case 1: Strict waiting is performed on each hop. If a data packet encounters a worst case at each hop, each hop experiences corresponding $D_{max}$ at that hop. In this case, an upper limit of a total end-to-end delay (that is, from a time when the ingress edge device 231 receives the data packet to a time when the data packet is sent from the egress edge device 235) is a sum of all $D_{max}$ in FIG. 10 or FIG. 11.

Case 2: If a data packet does not experience a worst case on a hop of device, that is, an actually experienced delay is less than $D_{max}$ corresponding to the hop of device, a remaining time of the data packet is recorded as an enqueuing standard on a subsequent hop. If congestion occurs on a device, a remaining time ($D_{res}$) of a data packet sent in advance is longer than that of the data packet that experiences strict waiting, and therefore a queue joined by the data packet sent in advance is scheduled later. The data packet sent in advance is scheduled out after waiting for a sufficient time, this is equivalent to that the data packet is sent after hop-by-hop strict waiting, and therefore the data packet can be sent within $D_{max}$.

The network device 233 is used as an example. It is assumed that the network device 233 receives a data packet 1 and a data packet 2, and the data packet 1 is a strictly waited packet. In this case, a value of $D^2_{res}$ of the data packet 1 is 0. The data packet 2 is a packet sent in advance, and therefore $D^2_{res}$ of the data packet 2 is greater than 0. The network device 232 may directly select a target queue for the data packet 1 based on a time at which the data packet 1 is received, but needs to select a target queue for the data packet 2 based on a sum of a time at which the data packet 2 is received and $D^2_{res}$ of the data packet 2. Refer to FIG. 5.

The following case may occur: The target queue of the data packet 1 is a queue Q1, and the target queue of the data packet 2 is a queue Q2. In this case, a priority of data packet 2 is lower than that of data packet 1. Therefore, the data packet 2 needs to be scheduled later than the data packet 1.

In conclusion, the technical solutions of this application can ensure that an upper limit of an end-to-end delay of any flow does not exceed a sum of $D_{max}$ of all output interfaces on a path of the flow.

Figure 12:
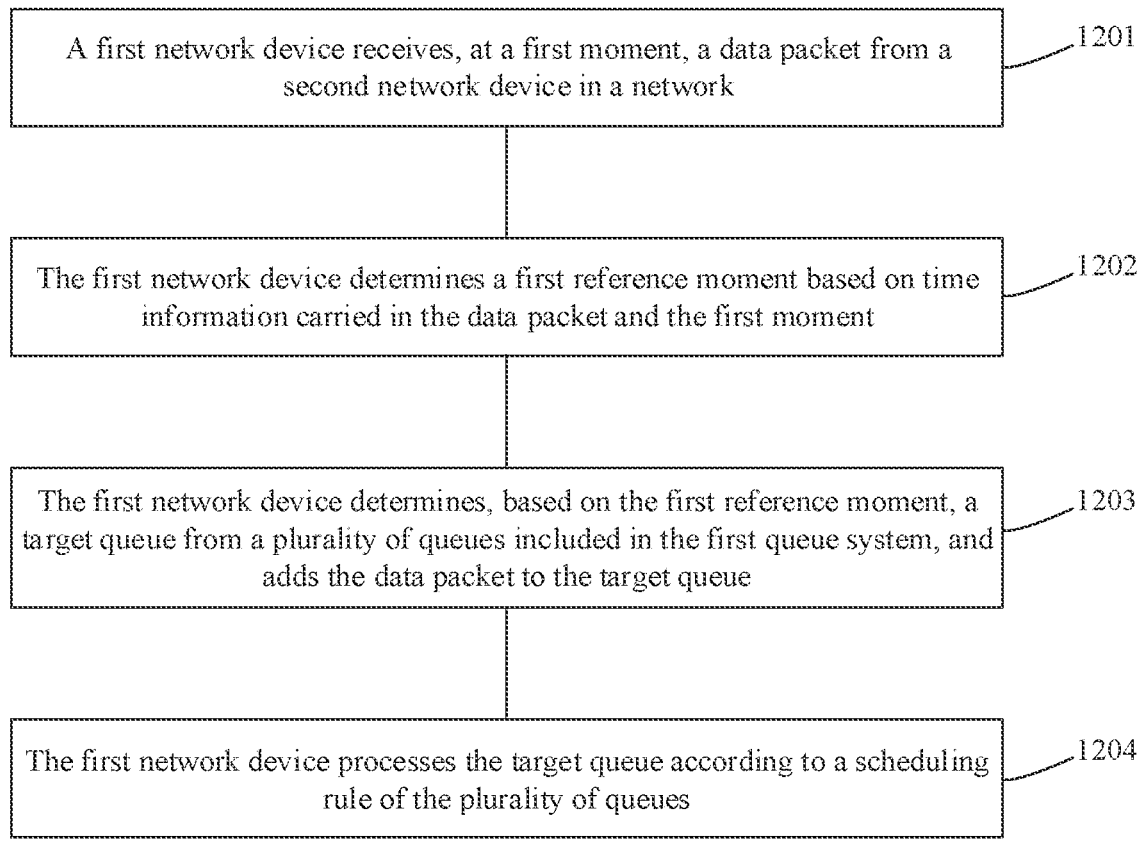
FIG. 12 is a schematic flowchart of a data packet scheduling method according to an embodiment of this application.

FIG. 12 is a schematic flowchart of a data packet scheduling method according to an embodiment of this application.

1201: A first network device receives, at a first moment, a data packet from a second network device in a network.

1202: The first network device determines a first reference moment based on time information carried in the data packet and the first moment, where the first reference moment is a reference moment at which the data packet enters a queue in a first queue system of the first network device.

1203: The first network device determines, based on the first reference moment, a target queue from a plurality of queues included in the first queue system, and adds the data packet to the target queue, where the time information indicates a first remaining processing time, the first remaining processing time is a difference between a first theoretical time upper limit for processing the data packet by N network devices and a first actual time, the N network devices include a network device through which the data packet passes after entering the network and before arriving at the first network device, and N is a positive integer greater than or equal to 1; and the first theoretical time upper limit is a theoretical time upper limit for a period of the data packet inside a network device from an initial reference moment to the first reference moment, the first actual time is an actual time of the data packet inside the network device from the initial reference moment to a second moment, the initial reference moment is a reference moment at which the data packet enters a queue system of a first network device in the N network devices, and the second moment is a moment at which the data packet enters the first queue system.

1204: The first network device processes the target queue according to a scheduling rule of the plurality of queues.

For example, the first network device may be the network device 232 in the foregoing embodiment. In this case, the second network device is the ingress edge device 231. For another example, the first network device is the network device 233 in the foregoing embodiment. In this case, the second network device is the network device 232. For another example, the first network device is the network device 234 in the foregoing embodiment. In this case, the second network device is the network device 233.

Assuming that the first network device is the network device 232, the first moment is $t^2_{in}$, the second moment is $t'^2_{in}$, the first reference moment is $E^2$, the initial reference moment is $E^1$, and the first remaining processing time is $D^1_{res}$.

In some embodiments, the time information includes first time indication information, the first time indication information indicates a time from a second reference moment to a second output moment, the second reference moment is a reference moment of the data packet in the second network device, and the second output moment is a moment at which the data packet is output from the second network device.

It is further assumed that the first network device is the network device 232, the second reference moment is $E^1$, and the second output moment is $t^1_{out}$.

In some embodiments, when N is a positive integer greater than or equal to 2, the time information further includes second time indication information, the second time indication information indicates a second remaining processing time, the second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device.

It is further assumed that the first network device is the network device 232, and the second remaining processing time is $D^0_{res}$.

In some embodiments, the time information further includes third time indication information, the third time indication information indicates a third theoretical time upper limit associated with the second network device, and the third theoretical time upper limit is a theoretical time upper limit for a period of the data packet inside the network device from the second reference moment to the first reference moment.

It is further assumed that the first network device is the network device 232, and the third theoretical time upper limit is $D^1_{max}$.

In some embodiments, the plurality of queues are in a one-to-one correspondence with a plurality of preset moments, and that the first network device determines, based on the first reference moment, a target queue from a plurality of queues included in the first queue system includes: The first network device determines, based on the first reference moment, that a queue corresponding to a target moment is the target queue, where the first reference moment is not greater than the target moment, any one of the plurality of preset moments is not included between the first reference moment and the target moment, and the target moment is one of the plurality of preset moments.

In some embodiments, that the first network device determines a first reference moment based on the time information and the first moment includes: The first network device determines the first reference moment according to the following formula:

$$E^{h+1} = D^h_{res} + [(D^h_{max}) - (t^h_{out} - E^h)] + t^{h+1}_{in} \quad \text{(Formula 12.1)}$$

$E^{h+1}$ represents the first reference moment, $D^h_{res}$ represents the second remaining processing time, $D^h_{max}$ represents the third theoretical processing time upper limit associated with the second network device, $t^h_{out}$ represents the second output moment, $E^h$ represents the second reference moment, and $t^{h+1}_{in}$ represents the first moment.

In some embodiments, that the first network device determines a first reference moment based on the time information and the first moment includes: The first network device determines the first reference moment based on the second moment, the time information, and the first moment.

In some embodiments, that the first network device determines a first reference moment based on the second moment, the time information, and the first moment includes: The first network device determines a third remaining processing time according to the following formula:

$$D^{h+1}_{res} = D^h_{res} + [(D^h_{max} - (t^h_{out} - E^h)) - (t^{h+1}_{in} - t'^{h+1}_{in})] \quad \text{(Formula 12.2)}$$

$D^{h+1}_{res}$ represents the third remaining processing time, $D^h_{res}$ represents the second remaining processing time, $D^h_{max}$ represents the third theoretical processing time upper limit associated with the second network device, $t^h_{out}$ represents the second output moment, $E^h$ represents the second reference moment, $t'^{h+1}_{in}$ represents the first moment, and $t'^{h+1}_{in}$ represents the second moment. The first network device determines a sum of the third remaining processing time and the second moment as the first reference moment.

Figure 13:
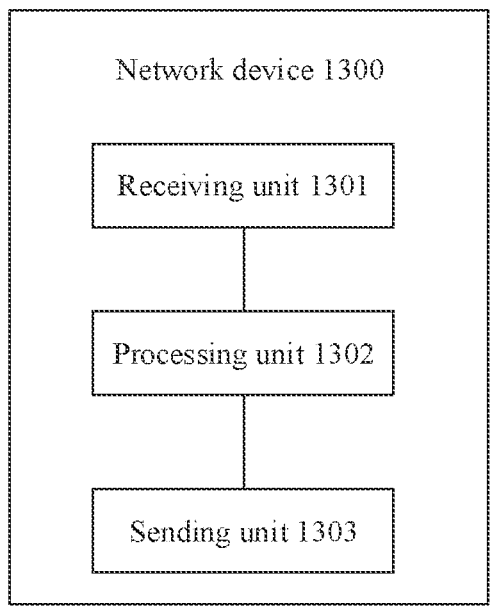
FIG. 13 is a schematic structural block diagram of a network device according to an embodiment of this application.

FIG. 13 is a schematic structural block diagram of a network device according to an embodiment of this application. The network device 1300 shown in FIG. 13 includes a receiving unit 1301 and a processing unit 1302.

The receiving unit 1301 is configured to receive, at a first moment, a data packet from a second network device in a network.

The processing unit 1302 is configured to determine a first reference moment based on time information carried in the data packet and the first moment, where the first reference moment is a reference moment at which the data packet enters a queue in a first queue system of the network device.

The processing unit 1302 is further configured to determine, based on the first reference moment, a target queue from a plurality of queues included in the first queue system, and adds the data packet to the target queue, where the time information indicates a first remaining processing time, the first remaining processing time is a difference between a first theoretical time upper limit for processing the data packet by N network devices and a first actual time, the N network devices include a network device through which the data packet passes after entering the network and before the network device, and N is a positive integer greater than or equal to 1; and the first theoretical time upper limit is a theoretical time upper limit for a period of the data packet inside a network device from an initial reference moment to the first reference moment, the first actual time is an actual time of the data packet inside the network device from the initial reference moment to a second moment, the initial reference moment is a reference moment at which the data packet enters a queue system of a first network device in the N network devices, and the second moment is a moment at which the data packet enters the first queue system.

The processing unit 1302 is further configured to process the target queue according to a scheduling rule of the plurality of queues.

The network device 1300 may further include a sending unit 1303. The sending unit 1303 may send the data packet to a next device based on a scheduling result of the processing unit 1302.

The receiving unit 1301 and the sending unit 1303 may be implemented by a receiver. The processing unit 1302 may be implemented by a processor. For specific functions and beneficial effects of the receiving unit 1301, the processing unit 1302, and the sending unit 1303, refer to the foregoing embodiments. For brevity, details are not described herein again.

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processing circuit (digital signal processor, DSP), a microcontroller (microcontroller unit, MCU), a programmable controller (programmable logic device, PLD), another programmable logic device, a discrete gate or a transistor logic device, a discrete hardware component, or another integrated chip.

In an implementation process, the steps of the foregoing methods may be completed by using a hardware integrated logic circuit, an instruction in a form of software, or program code in the processor. Steps of the methods disclosed with reference to embodiments of this application may be directly performed by a hardware processor, or may be performed by using a combination of hardware in the decoding processor and a software module. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, the steps of the foregoing method embodiments may be completed by using a hardware integrated logic circuit, an instruction in a form of software, or program code in the processor. The general-purpose processor may be a microprocessor, or the processor may be any conventional processor or the like. Steps of the methods disclosed with reference to embodiments of this application may be directly performed by a hardware decoding processor, or may be performed by using a combination of hardware and software modules in the decoding processor. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random-access memory (RAM), used as an external cache. Through example but not limitative description, many forms of RAMs may be used, for example, a static random-access memory (static RAM, SRAM), a dynamic random-access memory (dynamic RAM, DRAM), a synchronous dynamic random-access memory (synchronous DRAM, SDRAM), a double data rate synchronous dynamic random-access memory (double data rate SDRAM, DDR SDRAM), an enhanced synchronous dynamic random-access memory (enhanced SDRAM, ESDRAM), a synchronous link dynamic random-access memory (synchlink DRAM, SLDRAM), and a direct rambus dynamic random-access memory (direct rambus RAM, DR RAM). It should be noted that the memory of the systems and methods described in this specification includes but is not limited to these and any memory of another proper type.

According to the method provided in embodiments of this application, this application further provides a computer program product. The computer program product includes computer program code. When the computer program code is run on a computer, the computer is enabled to perform the method in any one of the foregoing embodiments.

According to the method provided in embodiments of this application, this application further provides a computer-readable medium. The computer-readable medium stores program code. When the program code is run on a computer, the computer is enabled to perform the method in any one of the foregoing embodiments.

According to the method provided in embodiments of this application, this application further provides a network system, including the foregoing plurality of network devices.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data packet scheduling method, comprising:
   receiving, by a first network device at a first moment, a data packet from a second network device in a network;
   determining, by the first network device, a first reference moment based on the first moment and time information carried in the data packet, wherein the first reference moment is a reference moment at which the data packet enters a queue in a first queue system of the first network device;
   determining, by the first network device based on the first reference moment, a target queue from a plurality of queues comprised in the first queue system;
   adding the data packet to the target queue, wherein the time information indicates a first remaining processing time, the first remaining processing time is a difference between a first theoretical time upper limit for processing the data packet by N network devices and a first actual time, the N network devices comprise a network device through which the data packet passes after entering the network and before arriving at the first network device, and N is a positive integer greater than or equal to 1, the first theoretical time upper limit is a theoretical time upper limit for a period of the data packet inside a network device from an initial reference moment to the first reference moment, the first actual time is an actual time of the data packet inside the network device from the initial reference moment to a second moment, the initial reference moment is a reference moment at which the data packet enters a queue system of a first network device in the N network devices, and the second moment is a moment at which the data packet enters the first queue system; and
   processing, by the first network device, the target queue according to a scheduling rule of the plurality of queues.

2. The method according to claim 1, wherein the time information comprises first time indication information, the first time indication information indicates a time from a second reference moment to a second output moment, the second reference moment is a reference moment of the data packet inside the second network device, and the second output moment is a moment at which the data packet is output from the second network device.

3. The method according to claim 2, wherein N is a positive integer greater than or equal to 2, the time information further comprises second time indication information indicating a second remaining processing time, the second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device.

4. The method according to claim 2, wherein the time information further comprises third time indication information indicating a third theoretical time upper limit associated with the second network device, and the third theoretical time upper limit is a theoretical time upper limit for a period of the data packet inside the network device from the second reference moment to the first reference moment.

5. The method according to claim 1, wherein the plurality of queues have a one-to-one correspondence with a plurality of preset moments, and the determining, by the first network device based on the first reference moment, a target queue from a plurality of queues comprised in the first queue system comprises:
determining, by the first network device based on the first reference moment, that a queue corresponding to a target moment is the target queue, wherein the first reference moment is no later than the target moment, none of the plurality of preset moments is between the first reference moment and the target moment, and the target moment is one of the plurality of preset moments.

6. The method according to claim 5, wherein the determining, by the first network device, a first reference moment based on time information and the first moment comprises:
determining, by the first network device, the first reference moment based on the second moment, the time information, and the first moment.

7. The method according to claim 6, wherein the determining, by the first network device, the first reference moment based on the second moment, the time information, and the first moment comprises:
determining, by the first network device, a third remaining processing time according to the following equation:

$D^{h+1}_{res} = D^h_{res} + [(D^h_{max} - (t^h_{out} - E^h)) - (t^{h+1}_{in} - t^h_{in})]$, wherein $D^{h+1}_{res}$ represents the third remaining processing time, $D^h_{res}$ represents the second remaining processing time, $D^h_{max}$ represents the third theoretical processing time upper limit associated with the second network device, $t^h_{out}$ represents the second output moment, $E^h$ represents the second reference moment, $t^{h+1}_{in}$ represents the first moment, and $t^1_{in}$ represents the second moment; and
determining, by the first network device, a sum of the third remaining processing time and the second moment as the first reference moment.

8. The method according to claim 1, wherein the determining, by the first network device, a first reference moment based on time information and the first moment comprises:
determining, by the first network device, the first reference moment according to the following equation:

$E^{h+1} = D^h_{res} + [(D^h_{max}) - (t^h_{out} - E^h)] + t^{h+1}_{in}$, wherein $E^{h+1}$ represents the first reference moment, $D^h_{res}$ represents the second remaining processing time, $D^h_{max}$ represents the third theoretical processing time upper limit associated with the second network device, $t^h_{out}$ represents the second output moment, $E^h$ represents the second reference moment, and $t^{h+1}_{in}$ represents the first moment.

9. A network device, comprising:
one or more processors; and
a memory coupled to the one or more processors and storing programming instructions for execution by the one or more processors to cause the network device to:
receive, at a first moment, a data packet from a second network device in a network; and
determine a first reference moment based on the first moment and time information carried in the data packet, wherein the first reference moment is a reference moment at which the data packet enters a queue in a first queue system of the network device;
determine, based on the first reference moment, a target queue from a plurality of queues comprised in the first queue system;
add the data packet to the target queue, wherein the time information indicates a first remaining processing time, the first remaining processing time is a difference between a first theoretical time upper limit for processing the data packet by N network devices and a first actual time, the N network devices comprise a network device through which the data packet passes after entering the network and before the network device, and N is a positive integer greater than or equal to 1, the first theoretical time upper limit is a theoretical time upper limit for a period of the data packet inside a network device from an initial reference moment to the first reference moment, the first actual time is an actual time of the data packet inside the network device from the initial reference moment to a second moment, the initial reference moment is a reference moment at which the data packet enters a queue system of a first network device in the N network devices, and the second moment is a moment at which the data packet enters the first queue system; and
process the target queue according to a scheduling rule of the plurality of queues.

10. The network device according to claim 9, wherein the time information comprises first time indication information, the first time indication information indicates a time from a second reference moment to a second output moment, the second reference moment is a reference moment of the data packet inside the second network device, and the second output moment is a moment at which the data packet is output from the second network device.

11. The network device according to claim 10, wherein N is a positive integer greater than or equal to 2, the time information further comprises second time indication information indicating a second remaining processing time, the second remaining processing time is a difference between a second theoretical time upper limit and a second actual time, the second theoretical time upper limit is a theoretical time upper limit for a period of the data packet inside the network device from the initial reference moment to the second reference moment, and the second actual time is an actual time of the data packet inside the network device from the initial reference moment to a moment at which the data packet enters a queue system of the second network device.

12. The network device according to claim 10, wherein the time information further comprises third time indication information indicating a third theoretical time upper limit associated with the second network device, and the third theoretical time upper limit is a theoretical time upper limit for a period of the data packet inside the network device from the second reference moment to the first reference moment.

13. The network device according to claim 9, wherein the plurality of queues have a one-to-one correspondence with a plurality of preset moments, and the programming instructions are for execution by the one or more processors to cause the network device to determine, based on the first reference moment, that a queue corresponding to a target moment is the target queue, wherein the first reference moment is no later than the target moment, none of the plurality of preset moments is comprised between the first reference moment and the target moment, and the target moment is one of the plurality of preset moments.

14. The network device according to claim 13, wherein the programming instructions are for execution by the one or more processors to cause the network device to determine the first reference moment based on the second moment, the time information, and the first moment.

15. The network device according to claim 14, wherein the programming instructions are for execution by the one or more processors to cause the network device to determine a third remaining processing time according to the following equation:

$$D^{h+1}_{res} = D^h_{res} + [(D^h_{max} - (t^h_{out} - E^h) - (t^{h+1}_{in} - t^{h+1}_{in})],$$
wherein $D^{h+1}$ represents the third remaining processing time, $D^h_{res}$ represents the second remaining processing time, $D^h_{max}$ represents the third theoretical processing time upper limit associated with the second network device, $t^h_{out}$ represents the second output moment, $E^h$ represents the second reference moment, $t^{h+1}_{in}$ represents the first moment, and $t^{h+1}_{in}$ represents the second moment; and determine a sum of the third remaining processing time and the second moment as the first reference moment.

16. The network device according to claim 9, wherein the programming instructions are for execution by the one or more processors to cause the network device to determine the first reference moment according to the following equation:

$$E^{h+1} = D^h_{res} + [(D^h_{max}) - (t^h_{out} - E^h)] + t^{h+1}_{in}, \text{ wherein}$$

$E^{h+1}$ represents the first reference moment, $D^h_{res}$ represents the second remaining processing time, $D^h_{max}$ represents the third theoretical processing time upper limit associated with the second network device, $t^h_{out}$ represents the second output moment, $E^h$ represents the second reference moment, and $t^{h+1}_{in}$ represents the first moment.

* * * * *

UNITED STATES PATENT AND TRADEMARK OFFICE
CERTIFICATE OF CORRECTION

PATENT NO. : 12,395,450 B2  
APPLICATION NO. : 18/162542  
DATED : August 19, 2025  
INVENTOR(S) : Chuang Wang et al.

Page 1 of 1

It is certified that error appears in the above-identified patent and that said Letters Patent is hereby corrected as shown below:

On the Title Page

In Column 2 (item (56) Other Publications), In Line 1, Delete "Appln" and insert -- Appln --.

In the Claims

In Column 25, In Line 41, In Claim 7, delete "$D^{h+1}_{res}=D^{h}_{res}+[(D^{h}_{max}-(t^{h}_{out}-E^{h})-(t'^{h+1}_{in}-t^{h+1}_{in})],$" and insert -- $D^{h+1}_{res}=D^{h}_{res}+[D^{h}_{max}-(t^{h}_{out}-E^{h})-(t'^{h+1}_{in}-t^{h+1}_{in})],$ --.

In Column 25, In Line 49, In Claim 7, delete "$t'^{1}_{in}$" and insert -- $t'^{h+1}_{in}$ --.

In Column 27, In Line 23 (Approx.), In Claim 15, delete "$D^{h+1}_{res}=D^{h}_{res}+[(D^{h}_{max}-(t^{h}_{out}-E^{h})-(t'^{h+1}_{in}-t^{h+1}_{in})],$" and insert -- $D^{h+1}_{res}=D^{h}_{res}+[D^{h}_{max}-(t^{h}_{out}-E^{h})-(t'^{h+1}_{in}-t^{h+1}_{in})],$ --.

Signed and Sealed this  
Thirtieth Day of December, 2025

John A. Squires  
*Director of the United States Patent and Trademark Office*